(12) United States Patent
Michaelson et al.

(10) Patent No.: US 8,523,657 B2
(45) Date of Patent: *Sep. 3, 2013

(54) GAMING SYSTEM, GAMING DEVICE AND METHOD FOR UTILIZING BITCOINS

(75) Inventors: Richard E. Michaelson, Reno, NV (US); Kehl T. Lesourd, Reno, NV (US)

(73) Assignee: IGT, Las Vegas, NV (US)

( * ) Notice: Subject to any disclaimer, the term of this patent is extended or adjusted under 35 U.S.C. 154(b) by 63 days.

This patent is subject to a terminal disclaimer.

(21) Appl. No.: 13/231,463

(22) Filed: Sep. 13, 2011

(65) Prior Publication Data

US 2013/0065669 A1    Mar. 14, 2013

(51) Int. Cl.
*A63F 13/00*    (2006.01)
(52) U.S. Cl.
USPC .............................. 463/20; 463/16
(58) Field of Classification Search
USPC .......................... 463/16–25, 31–42
See application file for complete search history.

(56) References Cited

U.S. PATENT DOCUMENTS

| | | | |
|---|---|---|---|
| 6,315,666 B1 * | 11/2001 | Mastera et al. | 463/31 |
| 6,371,852 B1 | 4/2002 | Acres | |
| 6,379,247 B1 | 4/2002 | Walker et al. | |
| 6,857,959 B1 | 2/2005 | Nguyen | |
| 6,991,544 B2 | 1/2006 | Soltys et al. | |
| 7,008,321 B2 | 3/2006 | Rowe et al. | |
| 7,077,746 B2 | 7/2006 | Torango | |
| 7,112,138 B2 | 9/2006 | Hedrick et al. | |
| 7,311,605 B2 | 12/2007 | Moser | |
| 7,351,142 B2 | 4/2008 | Walker et al. | |
| 7,419,430 B1 | 9/2008 | Joshi et al. | |
| 7,617,151 B2 | 11/2009 | Rowe | |
| 7,674,180 B2 | 3/2010 | Graham et al. | |
| 7,722,453 B2 | 5/2010 | Lark et al. | |
| 7,740,538 B2 | 6/2010 | Nguyen et al. | |
| 7,822,688 B2 | 10/2010 | Labrou et al. | |
| 7,867,079 B2 | 1/2011 | Govender et al. | |
| 7,927,212 B2 | 4/2011 | Hedrick et al. | |
| 7,946,917 B2 | 5/2011 | Kaminkow et al. | |
| 7,980,948 B2 | 7/2011 | Rowe et al. | |
| 7,985,133 B2 | 7/2011 | Baerlocher et al. | |
| 7,993,197 B2 | 8/2011 | Kaminkow | |
| 7,993,199 B2 | 8/2011 | Iddings et al. | |
| 7,997,978 B2 | 8/2011 | Kaminkow et al. | |
| 2002/0177480 A1 | 11/2002 | Rowe | |
| 2003/0212597 A1 | 11/2003 | Ollins | |
| 2005/0027381 A1 | 2/2005 | George et al. | |
| 2006/0058099 A1 | 3/2006 | Soukup et al. | |

(Continued)

OTHER PUBLICATIONS

Office Action for U.S. Appl. No. 13/231,509 dated Oct. 4, 2012.

(Continued)

*Primary Examiner* — Masud Ahmed
(74) *Attorney, Agent, or Firm* — Neal, Gerber & Eisenberg LLP

(57) ABSTRACT

The gaming system may enable a player to wager an amount of bitcoins on one or more plays of one or more primary or base games. If a player wagers an amount of bitcoins on a play of a game, the gaming system may determine and display an outcome for the play of the game. The gaming system then may determine if any award may be associated with the determined outcome. If an award having a value greater than zero is associated with the determined outcome, the gaming system may provide the determined award to the player, such as an amount of bitcoins.

34 Claims, 5 Drawing Sheets

(56) References Cited

U.S. PATENT DOCUMENTS

| | | |
|---|---|---|
| 2006/0084496 A1* | 4/2006 | Jaffe et al. .................. 463/20 |
| 2006/0148555 A1 | 7/2006 | Dent et al. |
| 2006/0279044 A1 | 12/2006 | Pacey |
| 2007/0060310 A1 | 3/2007 | Juds et al. |
| 2007/0135215 A1* | 6/2007 | Walker et al. ............... 463/29 |
| 2007/0191107 A1* | 8/2007 | Walker et al. ............... 463/42 |
| 2008/0032762 A1* | 2/2008 | Kane et al. .................. 463/16 |
| 2010/0120521 A1 | 5/2010 | Caputo et al. |
| 2011/0300923 A1 | 12/2011 | Van Luchene |
| 2012/0101886 A1* | 4/2012 | Subramanian et al. .... 705/14.23 |
| 2012/0184349 A1* | 7/2012 | Barclay et al. ............... 463/20 |
| 2012/0215652 A1* | 8/2012 | Melvin et al. ............... 705/26.1 |
| 2012/0239556 A1* | 9/2012 | Magruder et al. ........... 705/39 |

OTHER PUBLICATIONS

FAQ—Bitcoin article, printed from en.bitcoin.it/wiki/FAQ on Aug. 16, 2011.

Bitcoin article, printed from en.wikipedia.org/wiki/Bitcoin on Aug. 17, 2011.

Introduction to Bitcoin article, printed from en/bitcoin.it/wiki/introduction on Aug. 16, 2011.

Bitcoin address article, printed from en.bitcoin.it/wiki/address on Aug. 16, 2011.

International Search Report and Written Opinion of the International Searching Authority for related PCT Application No. PCT/US2012/053318, dated Nov. 20, 2012 (11 pages).

* cited by examiner

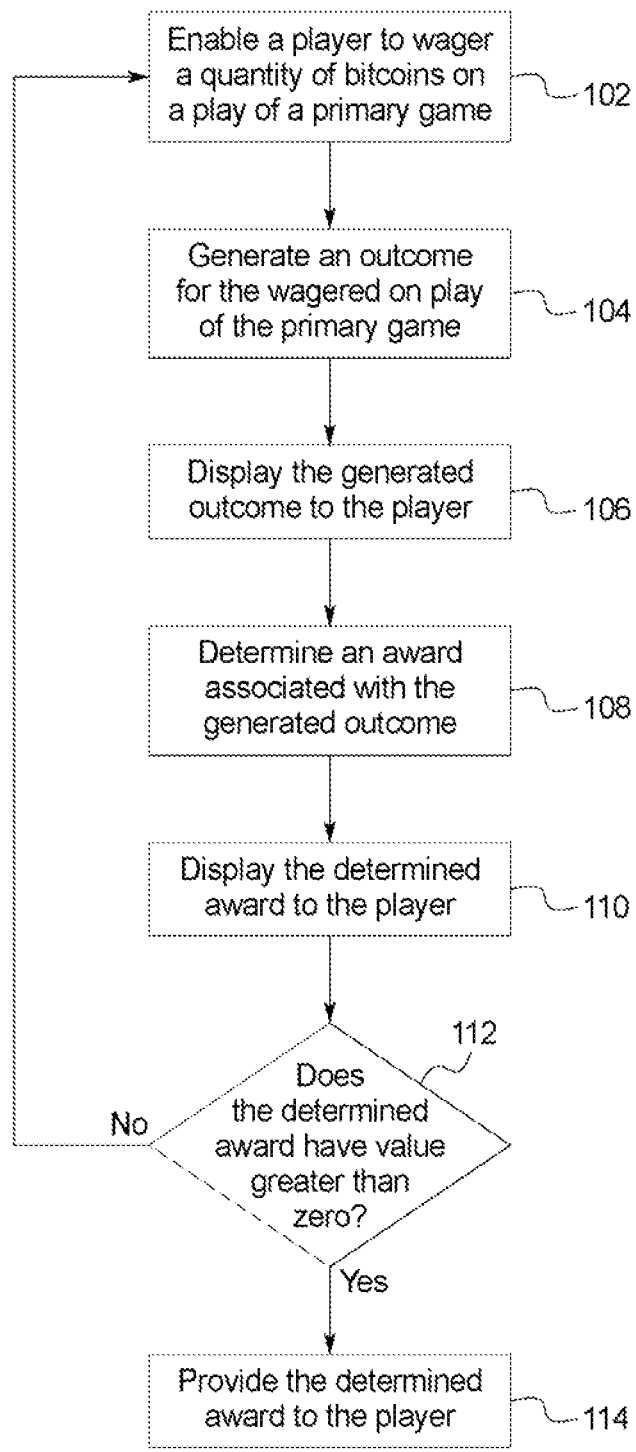

GAMING SYSTEM, GAMING DEVICE AND METHOD FOR UTILIZING BITCOINS

CROSS REFERENCE TO RELATED APPLICATIONS

This application relates to the following co-pending commonly owned patent applications: "GAMING SYSTEM, GAMING DEVICE AND METHOD FOR UTILIZING BITCOINS," Ser. No. 13/231,509.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Certain available gaming machines may enable players to play primary or base games in exchange for a wager of an amount of coins or banknotes of a particular government, such as U.S. dollars. In certain of these available gaming machines, when a player deposits an amount of coins or banknotes, the gaming machine converts the deposited amount into an amount of monetary credits or tokens. In these available gaming machines, the amount of the monetary credits or tokens placed as the wager on the primary game may vary based on the denomination of the gaming machine and the maximum wager amount associated with the gaming machine. For instance, a gaming machine may enable a player to wager a minimum number of monetary credits, such as one monetary credit (e.g., one penny, nickel, dime, quarter or dollar) up to the maximum number of monetary credits, such as five monetary credits. Thus, available gaming machines may enable players to make wagers of substantially different monetary credits or tokens on each play of the primary or base game. Accordingly, it may be appreciated that coins or banknotes (in the form of monetary credits or tokens) are an available form of currency in gaming establishments which enable different players to wager different amounts at substantially different rates of play.

Player tracking points may be another available form of currency in gaming establishments. Player tracking points may be maintained by a player tracking system. Player tracking systems may enable gaming establishments to recognize the value of customer loyalty through identifying frequent and/or high wagering players and rewarding them for their patronage. The cumulative history of a particular player's gaming activity, which may be included in a player profile of a typical player tracking system, may enable gaming establishments to target individual players with direct marketing promotions or customized reward plans. In typically available player tracking systems, the gaming establishment may issue each participating player a player identification card which has an encoded player identification or player tracking account number that uniquely identifies that player. When the player may sit down at a gaming machine, the player may insert the player tracking card into a card reader which may send information or data to a player tracking system to identify the player and the player's player tracking account. The gaming machine may typically monitor any player tracking points the player may earn for their current gaming session and before or upon the player removing their player tracking card, the gaming machine may communicate information or data relating to the player's gaming session to the player tracking system. Upon the conclusion of the player's current gaming session, the player tracking system may update the player's player tracking account accordingly.

Promotional credits may be another available form of currency at a gaming establishment. Promotional credits (delivered as either direct mail offers or as a result of a loyalty bonus) may be utilized in one or more wagering games to provide loyalty incentives to players. Such promotional credits may be offered as a one time event, such as for a player signing up for a player tracking card. Available promotional credits may not typically be immediately redeemable by a player for cash and may be played through the gaming machine.

Bitcoins are a form of internet currency. Bitcoins are intangible virtual coins in the form of a file that may be stored on a computer or a computer-related device. Specifically, a bitcoin ("BTC") is a unit of currency of a peer-to-peer system that is not regulated by any central or governmental authority. Rather, the regulation of bitcoins (i.e., the issuance of new bitcoins and the tracking of transactions involving bitcoins) may be accomplished collectively by the network of people and businesses that conduct business with bitcoins.

In operation, each time a network node or miner (i.e., a computer in communication with a network) finds the solution to a mathematical proof-of-work problem, a quantity of new bitcoins may be issued, generated or mined. Specifically, network nodes repeatedly try solving instances of the proof-of-work problem through trial and error, with each attempt having an equal and very low prior chance of being a correct solution. When a network node successfully solves the proof-of-work problem (i.e., the network node processes a block of transactions), the network node may be rewarded by receiving a programmed amount of bitcoins. These bitcoins compensate the operators of these network nodes for their computational work used to secure the bitcoin transactions. More specifically, bitcoin mining is the calculation of a hash of a block header, which includes among other things a reference to the previous block, a hash of a set of transactions and a nonce (i.e., a 32-bit field whose value may be set so that the hash of the block will contain a run of zeros). If the hash value is found to be less than the current target (which may be inversely proportional to the difficulty), a new block may be formed and the miner may be rewarded a quantity of newly generated bitcoins, such as fifty newly generated bitcoins. If the hash is not less than the current target, a new nonce may be tried, and a new hash may be calculated. This computation may be done millions of times per second by each miner.

While bitcoins are currently created by solving proof-of-work problems, the bitcoin network is programmed to gradually approach a maximum number of 21,000,000 available bitcoins. Specifically, the bitcoin supply is programmed to grow as a geometric series approximately every 4 years such that by 2013 half of the total available supply of bitcoins will be generated, and by 2017, 75% of the total available supply of bitcoins will be generated. Accordingly, to provide liquidity in the bitcoin supply, bitcoins are divisible to eight decimal places (i.e., to facilitate the use of fractional bitcoins).

Once generated or mined, a bitcoin may be stored in a person's bitcoin "wallet" which may be either stored on the person's computer by the bitcoin software or hosted on a third-party website. The wallet may show users their available bitcoin balance, any transaction history, and the collection of bitcoin addresses they may use to send and receive bitcoins with other users. If an owner of a bitcoin decides to:

(i) exchange a quantity of bitcoins for another form of currency, such as for U.S. dollars, and/or used (ii) use a quantity of bitcoins as a form of payment for goods or services, the owner of a bitcoin transfers the bitcoin to a payee by digitally signing a hash of the previous transaction (involving the bitcoin) and a public key of the payee and then adding these to the end of the bitcoin address. With such information viewable in the bitcoin address, the payee can verify the chain of ownership. For example, when a bitcoin belonging to user A is transferred to user B, user A's ownership over that bitcoin is relinquished by adding user B's public key address to the bitcoin coin and signing the result with the private key that is associated with user A's address. User B now owns the bitcoin and can transfer it further. In this example, user A is prevented from transferring the already spent bitcoin to other users because a public list of all previous transactions may be collectively maintained by the network.

Compared to existing types of available currency, bitcoins appear to have an increased level of anonymity. That is, while a person who has deposited an amount of an available currency, such as an amount of U.S. dollars, at a bank may be required to provide their identification to withdraw their deposited funds and/or transfer their deposited funds to another person, bitcoins are anonymous and do not require any identification (other than a randomly generated key address) of the people currently owning such bitcoins. Additionally, compared to existing types of available currency which rely on a central authority, such as a bank, to accurately maintain records regarding an amount of currency a person has deposited and to make an amount of deposited currency available to a person upon a person's request, bitcoins do not rely on any central authority to maintain any account balances.

While the adoption of bitcoins as a peer-to-peer currency continues to expand, no available gaming machines utilize bitcoins in association with any aspects of a player's gaming experience.

SUMMARY

The present disclosure relates generally to wagering gaming systems, gaming devices, and methods for utilizing bitcoins and bitcoin fractions.

In various embodiments, in addition to or as an alternative to enabling a player to wager amounts of available currencies (e.g., monetary credits or promotional credits) on one or more plays of one or more primary games, the wagering gaming system, gaming device and method disclosed herein may enable a player to wager an amount of bitcoins (or an amount of bitcoin fractions) on one or more plays of one or more primary or base games. In one such embodiment, the plays of the primary games may be displayed to the player in association with a gaming device located at a gaming establishment, such as a casino. In another such embodiment, the plays of the primary games may be displayed to the player in association with a networked environment, such as over the Internet. In these embodiments, if a player wagers an amount of bitcoins on a play of a game, the gaming system may determine and display an outcome for the play of the game. The gaming system then may determine if any award may be associated with the determined outcome. If an award having a value greater than zero is associated with the determined outcome, the gaming system may provide the determined award to the player. In one embodiment, the gaming system may provide the player the determined award as an amount of bitcoins (or an amount of bitcoin fractions). In another embodiment, the gaming system may provide the player the determined award in a different form of currency, such as an amount of U.S. dollars. Accordingly, unlike available gaming devices which enable a player to wager an amount of monetary credits, an amount of player tracking points and/or an amount of promotional credits on a play of a primary game, the gaming system disclosed herein additionally (or alternatively) may enable the player to wager and/or be provided an amount of bitcoins in association with a play of a wagering game. The introduction of this additional type of currency may provide players additional avenues to play wagering games and thus increases the level of excitement and enjoyment associated with a player's gaming experience.

In one embodiment, to assist in the utilization of bitcoins wagered at a gaming device located at a gaming establishment, the gaming system disclosed herein may include an interface that facilitates the exchange of bitcoins. That is, since bitcoins are an internet or network based currency, the gaming system may include one or more mobile interfaces configured to enable a player to utilize an amount of their internet based currency in a non-internet setting. In one example embodiment, the interface may be stored on a mobile media, such as a USB thumb drive, which may communicate with the gaming system to enable a player to upload and/or download bitcoin data or information from the player's bitcoin wallet in conjunction with playing the wagering games at the gaming device located in the gaming establishment. In another example embodiment, the interface may be stored in association with a player's account, such as a player tracking account, which enables a player to upload and/or download bitcoin data or information from the player's bitcoin wallet in conjunction with playing the wagering games at the gaming device located in the gaming establishment. Such embodiments thus provide a mobile (i.e., non-internet) interface configured to exchange bitcoins which advances the portability of this form of currency.

In various embodiments, in addition to or alternative to implementing bitcoins as an acceptable form of currency associated with a play of a wagering game, the gaming system, gaming device and method disclosed herein may utilize the processing power of a plurality of different processors to mine or otherwise generate new bitcoins. That is, the gaming system employs one or more processors of one or more individual gaming devices and/or one or more processors of one or more central servers, central controllers or remote hosts to find the solutions to the mathematical problems which faciliate the creation of a quantity of bitcoins. In this embodiment, if a player is playing at a gaming device and that gaming device is associated with the creation of a quantity of bitcoins, the gaming system may provide a bonus award to the player, such as a portion of the created quantity of bitcoins. Accordingly, the gaming system disclosed herein is configured to create value based on the gaming system's computing infrastructure and then provide this created value to a player.

Accordingly, the gaming system disclosed herein may provide additional functionality to certain gaming systems by recognizing an additional form of currency that may be utilized in association with a player's gaming experience. Moreover, the gaming system disclosed herein may provide additional award opportunities to players by providing one or more awards in exchange for utilizing the computing power of a player's currently played gaming device.

Additional features and advantages are described herein, and will be apparent from the following Detailed Description and the figures.

BRIEF DESCRIPTION OF THE FIGURES

FIG. 3 is a flowchart of one embodiment of the gaming system disclosed herein illustrating the utilization of an amount of bitcoins in association with a play of a wagering game.

DETAILED DESCRIPTION

The present disclosure may be implemented in various configurations for gaming machines, gaming devices, or gaming systems, including but not limited to: (1) a dedicated gaming machine, gaming device, or gaming system wherein the computerized instructions for controlling any games (which may be provided by the gaming machine or gaming device) may be provided with the gaming machine or gaming device prior to delivery to a gaming establishment; and (2) a changeable gaming machine, gaming device, or gaming system wherein the computerized instructions for controlling any games (which may be provided by the gaming machine or gaming device) may be downloadable to the gaming machine or gaming device through a data network after the gaming machine or gaming device is in a gaming establishment. In one embodiment, the computerized instructions for controlling any games may be executed by at least one central server, central controller, or remote host. In such a "thin client" embodiment, the central server remotely controls any games (or other suitable interfaces) and the gaming device may be utilized to display such games (or suitable interfaces) and receive one or more inputs or commands from a player. In another embodiment, the computerized instructions for controlling any games may be communicated from the central server, central controller, or remote host to a gaming device local processor and memory devices. In such a "thick client" embodiment, the gaming device local processor may execute the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device may be implemented in a thin client environment and certain other functions of the gaming device may be implemented in a thick client environment. In one such embodiment, computerized instructions for controlling any primary games may be communicated from the central server to the gaming device in a thick client configuration and computerized instructions for controlling any secondary games or bonus functions may be executed by a central server in a thin client configuration.

Figure 1A:
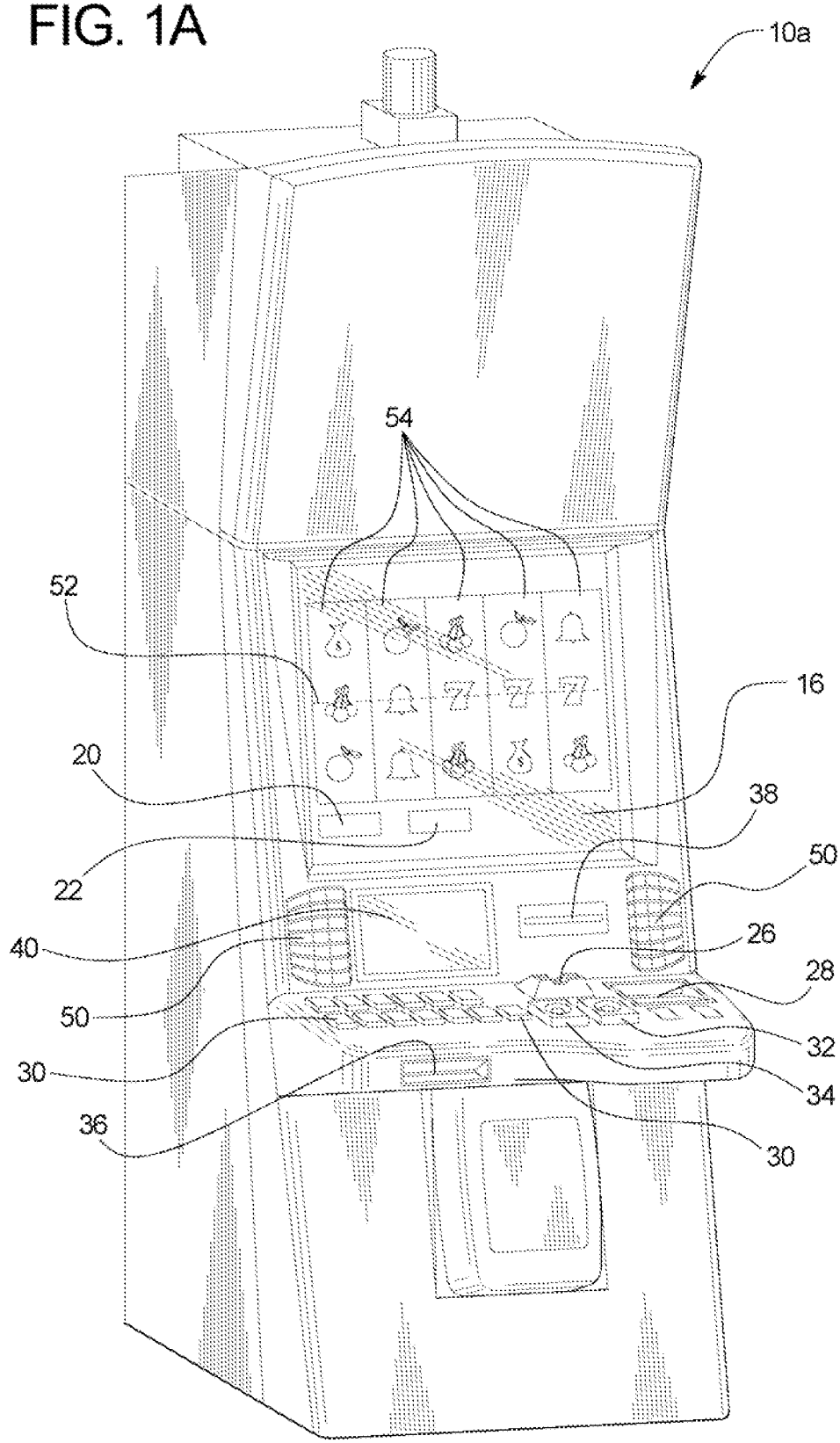
FIG. 1A is a front-side perspective view of one embodiment of the gaming device disclosed herein.
Figure 1B:
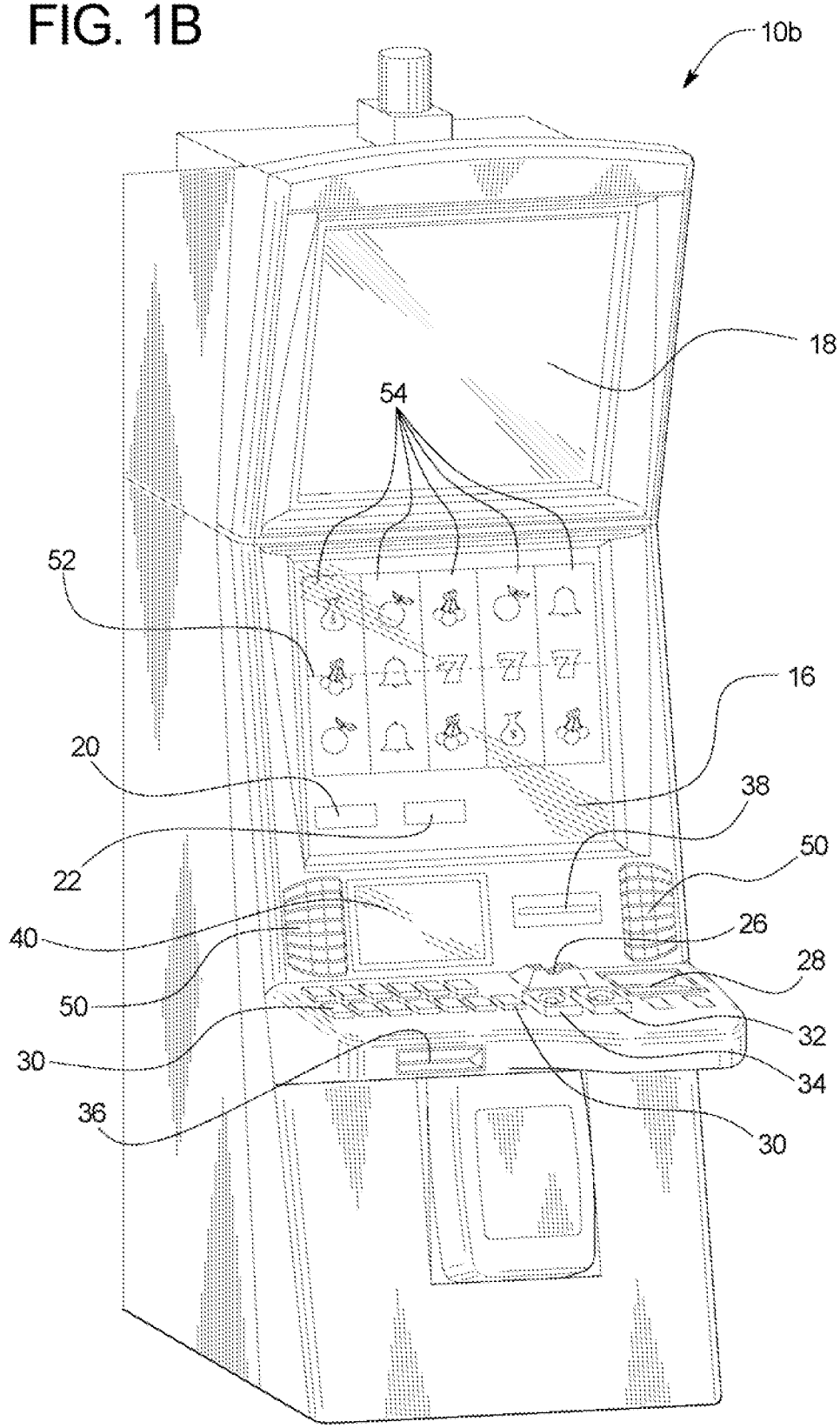
FIG. 1B is a front-side perspective view of another embodiment of the gaming device disclosed herein.

Referring now to the drawings, two example alternative embodiments of a gaming device disclosed herein are illustrated in FIGS. 1A and 1B as gaming device 10a and gaming device 10b, respectively. Gaming device 10a and/or gaming device 10b are generally referred to herein as gaming device 10.

In the embodiments illustrated in FIGS. 1A and 1B, gaming device 10 may have a support structure, housing, or cabinet which may provide support for a plurality of displays, inputs, controls, and other features of a conventional gaming machine. It is configured so that a player may operate it while standing or sitting. The gaming device may be positioned on a base or stand or may be configured as a pub-style table-top game (not shown) which a player may operate while sitting. As illustrated by the different configurations shown in FIGS. 1A and 1B, the gaming device may have varying cabinet and display configurations.

Figure 2A:
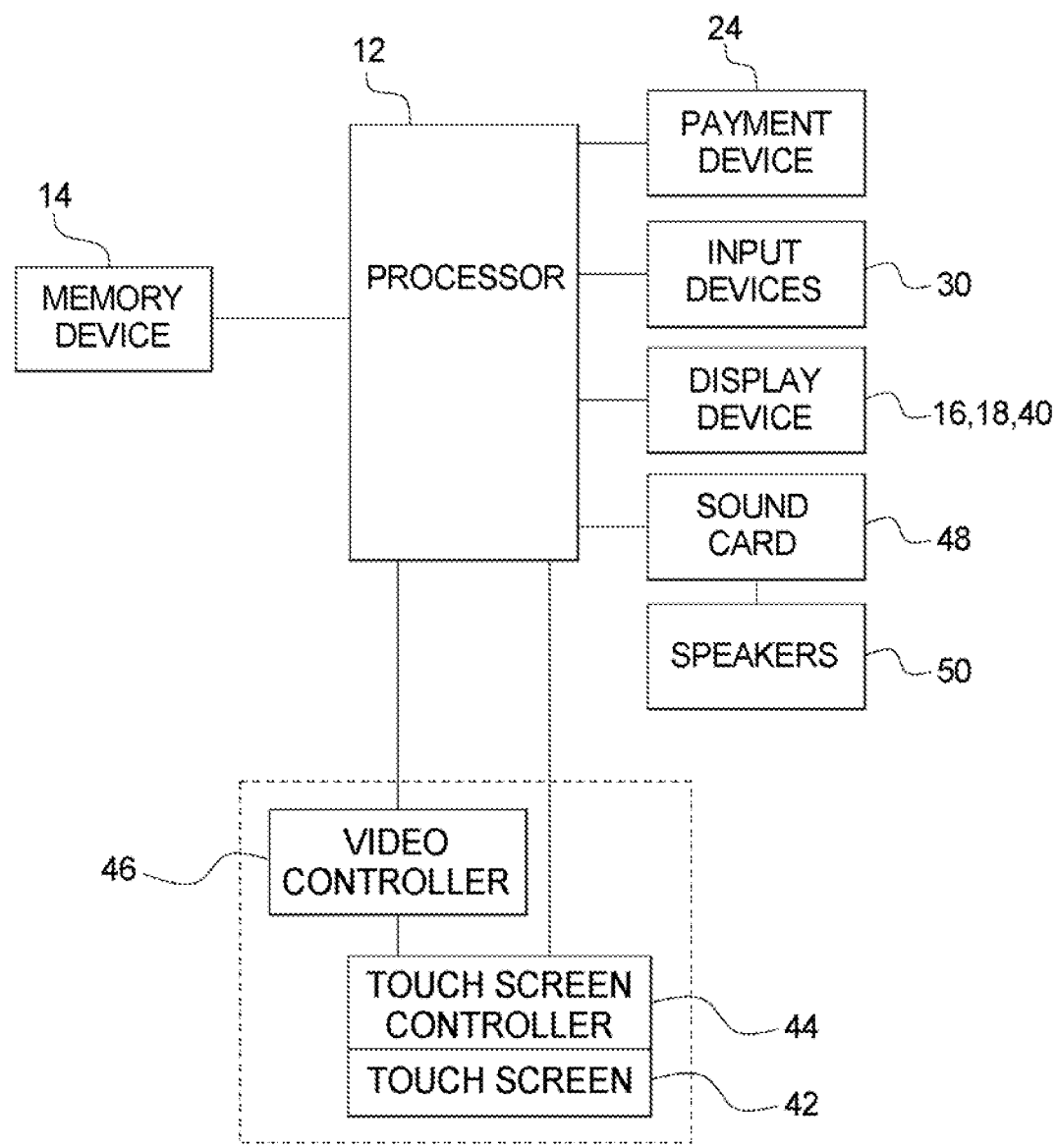
FIG. 2A is a schematic block diagram of the electronic configuration of one embodiment of the gaming device disclosed herein.

In one embodiment, as illustrated in FIG. 2A, the gaming device may include at least one processor 12, such as a microprocessor, a microcontroller-based platform, a suitable integrated circuit or one or more application-specific integrated circuits ("ASIC's"). The processor may be in communication with or operable to access or to exchange signals with at least one data storage or memory device 14. In one embodiment, the processor and the memory device reside within the cabinet of the gaming device. The memory device may store program code and instructions, executable by the processor, to control the gaming device. The memory device also may store other data such as image data, event data, player input data, random or pseudo-random number generators, paytable data or information, and applicable game rules that relate to the play of the gaming device. In one embodiment, the memory device may include random access memory ("RAM"), which may include non-volatile RAM ("NVRAM"), magnetic RAM ("MRAM"), ferroelectric RAM ("FeRAM"), and other forms as commonly understood in the gaming industry. In one embodiment, the memory device may include read only memory ("ROM"). In one embodiment, the memory device may include flash memory and/or electrically erasable programmable read only memory ("EEPROM"). Any other suitable magnetic, optical, and/or semiconductor memory may operate in conjunction with the gaming device disclosed herein.

In one embodiment, part or all of the program code and/or operating data described above may be stored in a detachable or removable memory device, including, but not limited to, a suitable cartridge, disk, CD ROM, DVD, or USB memory device. In other embodiments, part or all of the program code and/or operating data described above may be downloaded to the memory device through a suitable network.

In one embodiment, an operator or a player may use such a removable memory device in a desktop computer, a laptop computer, a hand-held device, such as a personal digital assistant ("PDA"), a portable computing or mobile device, or another computerized platform to implement the present disclosure. In one embodiment, the gaming device or gaming machine disclosed herein may be operable over a wireless network, for example as part of a wireless gaming system. In one such embodiment, the gaming machine may be a hand-held device, a mobile device, or any other suitable wireless device that may enable a player to play any suitable game at a variety of different locations. In various embodiments in which the gaming device or gaming machine may be a hand-held device, a mobile device, or any other suitable wireless device, at least one memory device and at least one processor which control the game or other operations of the hand-held device, mobile device, or other suitable wireless device may be located: (a) at the hand-held device, mobile device or other suitable wireless device; (b) at a central server or central controller; or (c) any suitable combination of the central server or central controller and the hand-held device, mobile device or other suitable wireless device. It may be appreciated that a gaming device or gaming machine as disclosed herein may be a device that may have obtained approval from a regulatory gaming commission or a device that may have not obtained approval from a regulatory gaming commission. It may be appreciated that the processor and memory device may be collectively referred to herein as a "computer" or "controller."

In one embodiment, as discussed in more detail below, the gaming device may randomly generate awards and/or other game outcomes based on probability data. In one such embodiment, this random determination may be provided through utilization of a random number generator ("RNG"), such as a true random number generator, a pseudo random number generator, or other suitable randomization process. In one embodiment, each award or other game outcome may be associated with a probability and the gaming device may generate the award or other game outcome to be provided to the player based on the associated probabilities. In this embodiment, since the gaming device may generate outcomes randomly or based upon one or more probability calculations, there is no certainty that the gaming device may ever provide the player with any specific award or other game outcome.

In another embodiment, as discussed in more detail below, the gaming device may employ a predetermined or finite set or pool of awards or other game outcomes. In this embodiment, as each award or other game outcome may be provided to the player, the gaming device may flag or remove the provided award or other game outcome from the predetermined set or pool. Once flagged or removed from the set or pool, the specific provided award or other game outcome from that specific pool cannot be provided to the player again. This type of gaming device may provide players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server may call the bingo balls that result in a specific bingo game outcome. The resultant game outcome may be communicated to the individual gaming device to be provided to a player. In one embodiment, this bingo outcome may be displayed to the player as a bingo game and/or in any form in accordance with the present disclosure.

In one embodiment, as illustrated in FIG. 2A, the gaming device may include one or more display devices controlled by the processor. The display devices may be connected to or mounted on the cabinet of the gaming device. The embodiment shown in FIG. 1A may include a central display device 16 which may display a primary game. This display device may also display any suitable secondary game associated with the primary game as well as information relating to the primary or secondary game. The alternative embodiment shown in FIG. 1B may include a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device may include a credit display 20 which may display a player's current number of credits, cash, account balance, or the equivalent. In one embodiment, the gaming device may include a bet display 22 which may display a player's amount wagered. In one embodiment, as described in more detail below, the gaming device may include a player tracking display 40 which may display information regarding a player's play tracking status.

In another embodiment, at least one display device may be a mobile display device, such as a PDA or tablet PC, that may enable play of at least a portion of the primary or secondary game at a location remote from the gaming device.

The display devices may include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In one embodiment, as described in more detail below, the display device may include a touch-screen with an associated touch-screen controller. The display devices may be of any suitable size and configuration, such as a square, a rectangle or an elongated rectangle.

The display devices of the gaming device may be configured to display at least one or a plurality of game or other suitable images, symbols and indicia such as any visual representation or exhibition of the movement of objects such as mechanical, virtual, or video reels and wheels, dynamic lighting, video images, images of people, characters, may place, things, faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels, or dice, configured to display at least one or a plurality of game or other suitable images, symbols or indicia.

As illustrated in FIG. 2A, in one embodiment, the gaming device may include at least one payment device 24 in communication with the processor. As seen in FIGS. 1A and 1B, a payment device such as a payment acceptor may include a note, ticket or bill acceptor 28 wherein the player inserts paper money, a ticket, or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card may be a smart card having a programmed microchip, a coded magnetic strip or coded rewritable magnetic strip, wherein the programmed microchip or magnetic strips may be coded with a player's identification, credit totals (or related data), and/or other relevant information. In another embodiment, a player may carry a portable device, such as a cell phone, a radio frequency identification tag, or any other suitable wireless device, which may communicate a player's identification, credit totals (or related data), and other relevant information to the gaming device. In one embodiment, money may be transferred to a gaming device through electronic funds transfer. When a player funds the gaming device, the processor may determine the amount of funds entered and may display the corresponding amount on the credit or other suitable display as described above.

As seen in FIGS. 1A, 1B, and 2A, in one embodiment the gaming device may include at least one or a plurality of input devices 30 in communication with the processor. The input devices may include any suitable device which may enable the player to produce an input signal which may be received by the processor. In one embodiment, after appropriate funding of the gaming device, the input device may be a game activation device, such as a play button 32 or a pull arm (not shown) which may be used by the player to start any primary game or sequence of events in the gaming device. The play button may be any suitable play activator such as a bet one button, a max bet button, or a repeat the bet button. In one embodiment, upon appropriate funding, the gaming device begins the game play automatically. In another embodiment, upon the player engaging one of the play buttons, the gaming device automatically activates game play.

In one embodiment, one input device may be a bet one button. The player may place a bet by pushing the bet one button. The player may increase the bet by one credit each time the player pushes the bet one button. When the player pushes the bet one button, the number of credits shown in the credit display may decrease by one, and the number of credits shown in the bet display may increase by one. In another embodiment, one input device may be a bet max button (not shown) which may enable the player to bet the maximum wager permitted for a game of the gaming device.

In one embodiment, one input device may be a cash out button 34. The player may push the cash out button to receive a cash payment or other suitable form of payment corresponding to the number of remaining credits. In one embodiment, when the player cashes out, a payment device, such as a ticket, payment, or note generator 36 prints or otherwise may generate a ticket or credit slip to provide to the player. The player may receive the ticket or credit slip and may redeem the value associated with the ticket or credit slip via a cashier (or other suitable redemption system). In another embodiment, when the player cashes out, the player may receive the coins or tokens in a coin payout tray. It may be appreciated that any suitable payout mechanisms, such as funding to the player's electronically recordable identification card or smart card, may be implemented in accordance with the gaming device disclosed herein.

In one embodiment, as mentioned above and as seen in FIG. 2A, one input device may be a touch-screen 42 coupled with a touch-screen controller 44 or some other touch-sensitive display overlay to allow for player interaction with the images on the display. The touch-screen and the touch-screen controller may be connected to a video controller 46. A player may make decisions and input signals into the gaming device by touching the touch-screen at the appropriate locations. One such input device may be a conventional touch-screen button panel.

The gaming device may further may include a plurality of communication ports for enabling communication of the processor with external peripherals, such as external video sources, expansion buses, game or other displays, a SCSI port, or a keypad.

In one embodiment, as seen in FIG. 2A, the gaming device may include a sound generating device controlled by one or more sounds cards 48 which function in conjunction with the processor. In one embodiment, the sound generating device may include at least one or a plurality of speakers 50 or other sound generating hardware and/or software for generating sounds, such as by playing music for the primary and/or secondary game or by playing music for other modes of the gaming device, such as an attract mode. In one embodiment, the gaming device may provide dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized to provide any appropriate information.

In one embodiment, the gaming machine may include a sensor, such as a camera, in communication with the processor (and possibly controlled by the processor), that may be selectively positioned to acquire an image of a player actively using the gaming device and/or the surrounding area of the gaming device. In one embodiment, the camera may be configured to selectively acquire still or moving (e.g., video) images and may be configured to acquire the images in an analog, digital, or other suitable format. The display devices may be configured to display the image acquired by the camera as well as to display the visible manifestation of the game in split screen or picture-in-picture fashion. For example, the camera may acquire an image of the player and the processor may incorporate that image into the primary and/or secondary game as a game image, symbol or indicia.

In one embodiment, the gaming device 10 may incorporate any suitable wagering game as the primary or base game. The gaming machine or device may include some or all of the features of conventional gaming machines or devices. The primary or base game may comprise any suitable reel-type game, card game, cascading or falling symbol game, number game, or other game of chance susceptible to representation in an electronic or electromechanical form, which in one embodiment may produce a random outcome based on probability data at the time of or after placement of a wager. That is, different primary wagering games, such as video poker games, video blackjack games, video keno, video bingo or any other suitable primary or base game may be implemented. In one embodiment, the disclosed multi-dimensional cascading symbol game may be implemented as a base or primary game.

In one embodiment, as illustrated in FIGS. 1A and 1B, a base or primary game may be a slot game with one or more paylines 52. In this embodiment, the gaming device may include at least one or a plurality of reels 54, such as three to five reels 54, in either electromechanical form with mechanical rotating reels or video form with simulated reels and movement thereof. In one embodiment, an electromechanical slot machine may include a plurality of adjacent, rotatable reels which may be combined and operably coupled with an electronic display of any suitable type. In another embodiment, if the reels 54 are in video form, one or more of the display devices, as described above, may display the plurality of simulated video reels 54. Each reel 54 may display a plurality of indicia or symbols, such as bells, hearts, fruits, numbers, letters, bars, or other images which may correspond to a theme associated with the gaming device. In another embodiment, one or more of the reels may be independent reels or unisymbol reels. In this embodiment, each independent or unisymbol reel may generate and may display one symbol to the player.

In one embodiment, one or more of the paylines may be horizontal, vertical, circular, diagonal, angled or any combination thereof. In another embodiment, one or more of the paylines each may include a plurality of adjacent symbol display positions on a requisite number of adjacent reels. In one such embodiment, one or more paylines may be formed between at least two symbol display positions which may be adjacent to each other by either sharing a common side or sharing a common corner (i.e., such paylines may be connected paylines). In these embodiments, the gaming device may enable a player to wager on one or more of such paylines to activate such wagered on paylines.

In another embodiment wherein one or more paylines may be formed between at least two symbol display positions which may be adjacent to each other, the gaming device may enable a player to wager on and thus activate a plurality of symbol display positions. In this embodiment, one or more paylines which may be formed from a plurality of adjacent active symbol display positions on a requisite number of adjacent reels may be activated.

In one embodiment, the gaming device may award prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device may determine any outcome to provide to the player based on the number of associated symbols which may be generated in active symbol display positions on the requisite number of adjacent reels (i.e., not on paylines passing through any displayed winning symbol combinations). In this embodiment, if a winning symbol combination is generated on the reels, the gaming device may provide the player one award for that occurrence of the generated winning symbol combination. For example, if one winning symbol combination is generated on the reels, the gaming device may provide a single award to the player for that winning symbol combination (i.e., not based on the number of paylines that would have passed through that winning symbol combination). It may be appreciated that a gaming device that may enable wagering on ways to win may provide the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win may be determined by multiplying the number of symbols generated in active symbol display positions on a first reel by the number of symbols generated in active symbol display positions on a second reel by the number of symbols generated in active symbol display positions on a third reel and so on for each reel of the gaming device with at least one symbol generated in an active symbol display position. For example, a three reel gaming device with three symbols generated in active symbol display positions on each reel includes 27 ways to win (i.e., 3 symbols on the first reel×3 symbols on the second reel×3 symbols on the third reel). A four reel gaming device with three symbols generated in active symbol display positions on each reel includes 81 ways to win (i.e., 3 symbols on the first reel×3 symbols on the second reel×3 symbols on the third reel×3 symbols on the fourth reel). A five reel gaming device with three symbols generated in active symbol display positions on each reel includes 243 ways to win (i.e., 3 symbols on the first reel×3 symbols on the second reel×3 symbols on the third reel×3 symbols on the fourth reel×3 symbols on the fifth reel). It may be appreciated that modifying the number of generated symbols by either modifying the number of reels or modifying the number of symbols generated in active symbol display positions by one or more of the reels modifies the number of ways to win.

In another embodiment, the gaming device may enable a player to wager on and thus activate symbol display positions. In one such embodiment, the symbol display positions may be on the reels. In this embodiment, if based on the player's wager, a reel is activated, then each of the symbol display positions of that reel may be activated and each of the active symbol display positions may be part of one or more of the ways to win. In one embodiment, if based on the player's wager, a reel is not activated, then a designated number of default symbol display positions, such as a single symbol display position of the middle row of the reel, may be activated and the default symbol display position(s) may be part of one or more of the ways to win. This type of gaming machine may enable a player to wager on one, more than one or all of the reels and the processor of the gaming device uses the number of wagered on reels to determine the active symbol display positions and the number of possible ways to win. In alternative embodiments, (1) no symbols may be displayed as generated at any of the inactive symbol display positions, or (2) any symbols generated at any inactive symbol display positions may be displayed to the player but suitably shaded or otherwise designated as inactive.

In one embodiment wherein a player wagers on one or more reels, a player's wager of one credit may activate each of the three symbol display positions on a first reel, wherein one default symbol display position may be activated on each of the remaining four reels. In this example, as described above, the gaming device may provide the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol display positions on a first reel, each of the three symbol display positions on a second reel and each of the three symbol display positions on a third reel wherein one default symbol display position may be activated on each of the remaining two reels. In this example, as described above, the gaming device may provide the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually may determine if a symbol generated in an active symbol display position on a first reel may form part of a winning symbol combination with or is otherwise suitably related to a symbol generated in an active symbol display position on a second reel. In this embodiment, the gaming device classifies each pair of symbols which form part of a winning symbol combination (i.e., each pair of related symbols) as a string of related symbols. For example, if active symbol display positions may include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device may determine if any of the symbols from the next adjacent reel may be added to any of the formed strings of related symbols. In this embodiment, for a first of the classified strings of related symbols, the gaming device may determine if any of the symbols generated by the next adjacent reel form part of a winning symbol combination or are otherwise related to the symbols of the first string of related symbols. If the gaming device determines that a symbol generated on the next adjacent reel may be related to the symbols of the first string of related symbols, that symbol may be subsequently added to the first string of related symbols. For example, if the first string of related symbols is the string of related cherry symbols and a related cherry symbol is generated in the middle row of the third reel, the gaming device may add the related cherry symbol generated on the third reel to the previously classified string of cherry symbols.

On the other hand, if the gaming device determines that no symbols generated on the next adjacent reel are related to the symbols of the first string of related symbols, the gaming device may mark or flag such string of related symbols as complete. For example, if the first string of related symbols is the string of related cherry symbols and none of the symbols of the third reel are related to the cherry symbols of the previously classified string of cherry symbols, the gaming device marks or flags the string of two cherry symbols as complete.

After either adding a related symbol to the first string of related symbols or marking the first string of related symbols as complete, the gaming device may proceed as described above for each of the remaining classified strings of related symbols which were previously classified or formed from related symbols on the first and second reels.

After analyzing each of the remaining strings of related symbols, the gaming device may determine, for each remaining pending or incomplete string of related symbols, if any of the symbols from the next adjacent reel, if any, may be added to any of the previously classified strings of related symbols. This process may continue until either each string of related symbols is complete or there are no more adjacent reels of symbols to analyze. In this embodiment, where there are no more adjacent reels of symbols to analyze, the gaming device may mark each of the remaining pending strings of related symbols as complete.

When each of the strings of related symbols is marked complete, the gaming device compares each of the strings of related symbols to an appropriate paytable and may provide the player any award associated with each of the completed strings of symbols. It may be appreciated that the player may be provided one award, if any, for each string of related symbols generated in active symbol display positions (i.e., as opposed to a quantity of awards being based on how many paylines that would have passed through each of the strings of related symbols in active symbol display positions).

In one embodiment, a base or primary game may be a poker game wherein the gaming device may enable the player to play a conventional game of video draw poker and may initially deal five cards all face up from a virtual deck of fifty-two cards. Cards may be dealt as in a traditional game of cards or in the case of the gaming device, the cards may be randomly selected from a predetermined number of cards. If the player wishes to draw, the player may select the cards to hold via one or more input devices, such as by pressing related hold buttons or via the touch screen. The player then presses the deal button and the unwanted or discarded cards may be removed from the display and the gaming machine may deal the replacement cards from the remaining cards in the deck. This may result in a final five-card hand. The gaming device may compare the final five-card hand to a payout table which may utilize conventional poker hand rankings to determine the winning hands. The gaming device may provide the player with an award based on a winning hand and the number of credits the player wagered.

In another embodiment, the base or primary game may be a multi-hand version of video poker. In this embodiment, the gaming device may deal the player at least two hands of cards. In one such embodiment, the cards may be the same cards. In one embodiment each hand of cards may be associated with its own deck of cards. The player may choose the cards to hold in a primary hand. The held cards in the primary hand may be also held in the other hands of cards. The remaining non-held cards may be removed from each hand displayed and for each hand replacement cards may be randomly dealt into that hand. Since the replacement cards may be randomly dealt independently for each hand, the replacement cards for each hand may be different. The poker hand rankings may be then determined hand by hand against a payout table and awards may be provided to the player.

In one embodiment, a base or primary game may be a keno game wherein the gaming device may display a plurality of selectable indicia or numbers on at least one of the display devices. In this embodiment, the player may select at least one bit potentially a plurality of the selectable indicia or numbers via an input device such as a touch screen. The gaming device then may display a series of drawn numbers and determine an amount of matches, if any, between the player's selected numbers and the gaming device's drawn numbers. The player may be provided an award based on the amount of matches, if any, based on the amount of determined matches and the number of numbers drawn.

In one embodiment, in addition to winning credits or other awards in a base or primary game, the gaming device may also give players the opportunity to win credits in a bonus or secondary game or in a bonus or secondary round. In one embodiment, the disclosed multi-dimensional cascading symbol game may be implemented as a bonus or secondary game. The bonus or secondary game may enable the player to obtain a prize or payout in addition to the prize or payout, if any, obtained from the base or primary game. In general, a bonus or secondary game may produce a significantly higher level of player excitement than the base or primary game because it may provide a greater expectation of winning than the base or primary game, and may be accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition may occur based on exceeding a certain amount of game play (such as number of games, number of credits, amount of time), or reaching a specified number of points earned during game play.

In one embodiment, the gaming device processor 12 or central controller 56 randomly may provide the player one or more plays of one or more secondary games. In one such embodiment, the gaming device may not provide any apparent reason to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device may include a program which may automatically begin a bonus round after the player may have achieved a triggering event or qualifying condition in the base or primary game. In another embodiment, after a player may have qualified for a bonus game, the player may subsequently enhance his/her bonus game participation through continued play on the base or primary game. Thus, for each bonus qualifying event, such as a bonus symbol, that the player may obtain, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy-in for a bonus game may be needed. That is, a player may not purchase entry into a bonus game; rather they may win or earn entry through play of the primary game, thus encouraging play of the primary game. In another embodiment, qualification of the bonus or secondary game may be accomplished through a simple "buy-in" by the player—for example, if the player has been unsuccessful at qualifying through other specified activities. In another embodiment, the player may make a separate side-wager on the bonus game or wager a designated amount in the primary game to qualify for the secondary game. In this embodiment, the secondary game triggering event may occur and the side-wager (or designated primary game wager amount) must have been placed to trigger the secondary game.

Figure 2B:
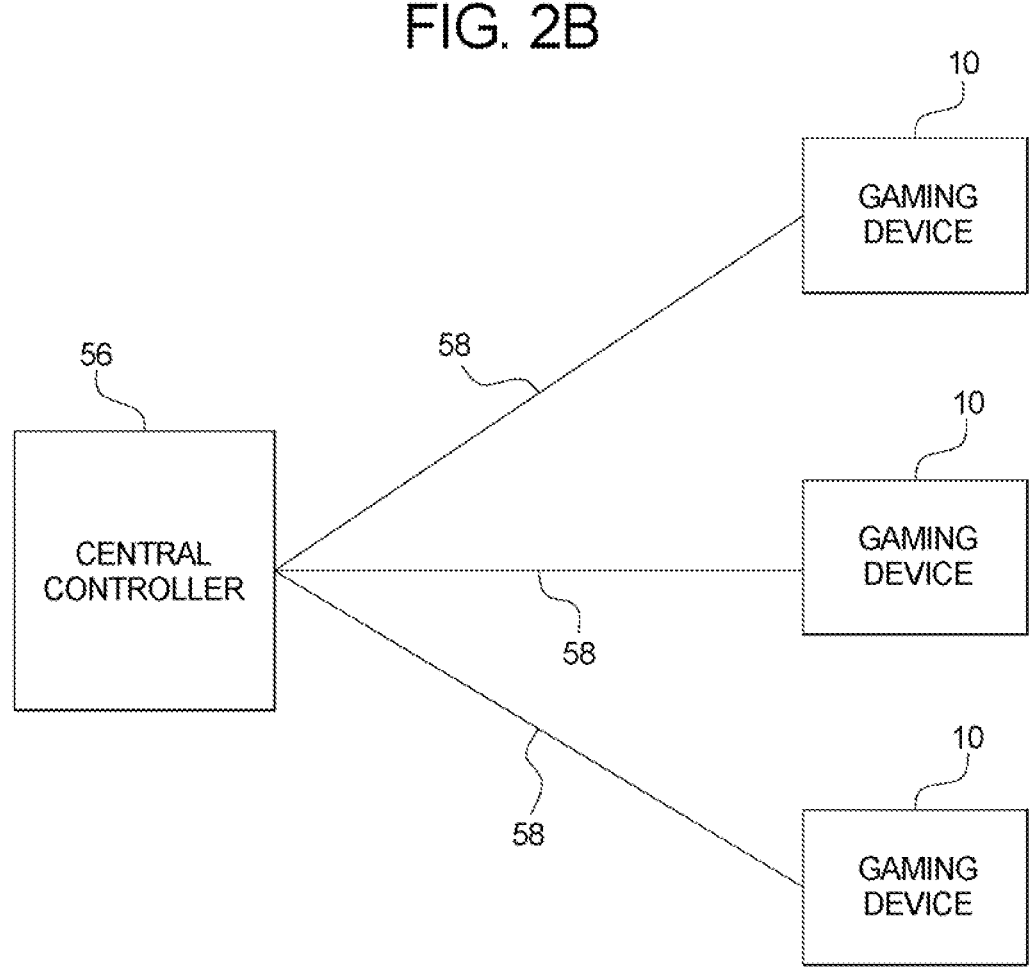
FIG. 2B is a schematic block diagram illustrating a plurality of gaming devices in communication with a central controller.

In one embodiment, as illustrated in FIG. 2B, one or more of the gaming devices 10 may be in communication with each other and/or at least one central controller 56 through a data network or remote communication link 58. In this embodiment, the central server, central controller or remote host may be any suitable server or computing device which may include at least one processor and at least one memory or storage device. In different such embodiments, the central server may be a progressive controller or a processor of one of the gaming devices in the gaming system. In these embodiments, the processor of each gaming device may be designed to transmit and receive events, messages, commands, or any other suitable data or signal between the individual gaming device and the central server. The gaming device processor may be operable to execute such communicated events, messages, or commands in conjunction with the operation of the gaming device. Moreover, the processor of the central server may be designed to transmit and receive events, messages, commands, or any other suitable data or signal between the central server and each of the individual gaming devices. The central server processor may be operable to execute such communicated events, messages, or commands in conjunction with the operation of the central server. It may be appreciated that one, more or each of the functions of the central controller, central server or remote host as disclosed herein may be performed by one or more gaming device processors. It may be further appreciated that one, more or each of the functions of one or more gaming device processors as disclosed herein may be performed by the central controller, central server or remote host.

In one embodiment, the game outcome provided to the player may be determined by a central server or controller and provided to the player at the gaming device. In this embodiment, each of a plurality of such gaming devices may be in communication with the central server or controller. Upon a player initiating game play at one of the gaming devices, the initiated gaming device may communicate a game outcome request to the central server or controller.

In one embodiment, the central server or controller may receive the game outcome request and may randomly generate a game outcome for the primary game based on probability data. In another embodiment, the central server or controller may randomly generate a game outcome for the secondary game based on probability data. In another embodiment, the central server or controller may randomly generate a game outcome for both the primary game and the secondary game based on probability data. In this embodiment, the central server or controller may be capable of storing and utilizing program code or other data similar to the processor and memory device of the gaming device.

In an alternative embodiment, the central server or controller maintains one or more predetermined pools or sets of predetermined game outcomes. In this embodiment, the central server or controller may receive the game outcome request and independently select a predetermined game outcome from a set or pool of game outcomes. The central server or controller may flag or mark the selected game outcome as used. Once a game outcome is flagged as used, it may be prevented from further selection from the set or pool and cannot be selected by the central controller or server upon another wager. The provided game outcome may include a primary game outcome, a secondary game outcome, primary and secondary game outcomes, or a series of game outcomes such as free games.

The central server or controller may communicate the generated or selected game outcome to the initiated gaming device. The gaming device may receive the generated or selected game outcome and may provide the game outcome to the player. In an alternative embodiment, how the generated or selected game outcome is to be presented or displayed to the player, such as a reel symbol combination of a slot machine or a hand of cards dealt in a card game, may also be determined by the central server or controller and communicated to the initiated gaming device to be presented or displayed to the player. Central production or control may assist a gaming establishment or other entity in maintaining appropriate records, controlling gaming, reducing and preventing cheating or electronic or other errors, reducing or eliminating win-loss volatility, and the like.

In another embodiment, a predetermined game outcome value may be determined for each of a plurality of linked or networked gaming devices based on the results of a bingo, keno, or lottery game. In this embodiment, each individual gaming device may utilize one or more bingo, keno, or lottery games to determine the predetermined game outcome value provided to the player for the interactive game played at that gaming device. In one embodiment, the bingo, keno, or lottery game may be displayed to the player. In another embodiment, the bingo, keno or lottery game may not be displayed to the player, but the results of the bingo, keno, or lottery game determine the predetermined game outcome value for the primary or secondary game.

In the various bingo embodiments, as each gaming device is enrolled in the bingo game, such as upon an appropriate wager or engaging an input device, the enrolled gaming device may be provided or associated with a different bingo card. Each bingo card may consist of a matrix or array of elements, wherein each element may be designated with a separate indicia, such as a number. It may be appreciated that each different bingo card may include a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card with each of a plurality of enrolled gaming devices, the central controller may randomly select or draw, one at a time, a plurality of the elements. As each element is selected, a determination may be made for each gaming device as to whether the selected element is present on the bingo card provided to that enrolled gaming device. This determination may be made by the central controller, the gaming device, a combination of the two, or in any other suitable manner. If the selected element is present on the bingo card provided to that enrolled gaming device, that selected element on the provided bingo card may be marked or flagged. This process of selecting elements and marking any selected elements on the provided bingo cards may continue until one or more predetermined patterns are marked on one or more of the provided bingo cards. It may be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome may be determined for each of the enrolled gaming devices based, at least in part, on the selected elements on the provided bingo cards. As described above, the game outcome determined for each gaming device enrolled in the bingo game may be utilized by that gaming device to determine the predetermined game outcome provided to the player. For example, a first gaming device to have selected elements marked in a predetermined pattern may be provided a first outcome of win $10 which may be provided to a first player regardless of how the first player plays in a first game, and a second gaming device to have selected elements marked in a different predetermined pattern may be provided a second outcome of win $2 which may be provided to a second player regardless of how the second player plays a second game. It may be appreciated that as the process of marking selected elements may continue until one or more predetermined patterns are marked, this embodiment ensures that at least one bingo card may win the bingo game and thus at least one enrolled gaming device may provide a predetermined winning game outcome to a player. It may be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern may be provided to the player as part of the predetermined game outcome. For example, if the four corners of a bingo card are marked within the first twenty selected elements, a supplemental award of $10 may be provided to the player as part of the predetermined game outcome. It may be appreciated that in this embodiment, the player of a gaming device may be provided a supplemental or intermittent award regardless of whether the enrolled gaming device's provided bingo card wins or does not win the bingo game as described above.

In another embodiment, one or more of the gaming devices may be in communication with a central server or controller for monitoring purposes only. That is, each individual gaming device may randomly generate the game outcomes to be provided to the player and the central server or controller monitors the activities and events occurring on the plurality of gaming devices. In one embodiment, the gaming network may include a real-time or on-line accounting and gaming information system operably coupled to the central server or controller. The accounting and gaming information system of this embodiment may include a player database for storing player profiles, a player tracking module for tracking players and a credit system for providing automated casino transactions.

In one embodiment, the gaming device disclosed herein may be associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system may track any player's gaming activity at the gaming device. In one such embodiment, the gaming device may include at least one card reader 38 in communication with the processor. In this embodiment, a player may be issued a player identification card which may have an encoded player identification number that uniquely identifies the player. When a player inserts their playing tracking card into the card reader to begin a gaming session, the card reader reads the player identification number off the player tracking card to identify the player. The gaming device and/or associated player tracking system may timely track any suitable information or data relating to the identified player's gaming session. Directly or via the central controller, the gaming device processor may communicate such information to the player tracking system. The gaming device and/or associated player tracking system also may timely track when a player removes their player tracking card when concluding play for that gaming session. In another embodiment, rather than requiring a player to insert a player tracking card, the gaming device may utilize one or more portable devices carried by a player, such as a cell phone, a radio frequency identification tag or any other suitable wireless device to track when a player begins and ends a gaming session. In another embodiment, the gaming device may utilize any suitable biometric technology or ticket technology to track when a player begins and ends a gaming session.

During one or more gaming sessions, the gaming device and/or player tracking system may track any suitable information or data, such as any amounts wagered, average wager amounts, and/or the time at which these wagers may be placed. In different embodiments, for one or more players, the player tracking system may include the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system may be displayed on a player tracking display 40. In another embodiment, such tracked information and/or any suitable feature associated with the player tracking system may be displayed via one or more service windows (not shown) which may be displayed on the central display device and/or the upper display device.

In one embodiment, a plurality of the gaming devices may be capable of being connected together through a data network. In one embodiment, the data network may be a local area network (LAN), in which one or more of the gaming devices may be substantially proximate to each other and an on-site central server or controller as in, for example, a gaming establishment or a portion of a gaming establishment. In another embodiment, the data network may be a wide area network (WAN) in which one or more of the gaming devices may be in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to one another.

In another embodiment, the data network may be an internet or intranet. In this embodiment, the operation of the gaming device may be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer or other internet facilitator may be available. The expansion in the number of computers and number and speed of internet connections in recent years increases opportunities for players to play from an ever-increasing number of remote sites. It may be appreciated that the enhanced bandwidth of digital wireless communications may render such technology suitable for some or all communications, particularly if such communications may be encrypted. Higher data transmission speeds may be useful for enhancing the sophistication and response of the display and interaction with the player.

As mentioned above, in one embodiment, the present disclosure may be employed in a server-based gaming system. In one such embodiment, as described above, one or more gaming devices may be in communication with a central server or controller. The central server or controller may be any suitable server or computing device which may include at least one processor and a memory or storage device. In alternative embodiments, the central server may be a progressive controller or another gaming machine in the gaming system. In one embodiment, the memory device of the central server may store different game programs and instructions, executable by a gaming device processor, to control the gaming device. Each executable game program may represent a different game or type of game which may be played on one or more of the gaming devices in the gaming system. Such different games may include the same or substantially the same game play with different pay tables. In different embodiments, the executable game program may be for a primary game, a secondary game or both. In another embodiment, the game program may be executable as a secondary game to be played simultaneous with the play of a primary game (which may be downloaded to or fixed on the gaming device) or vice versa.

In this embodiment, each gaming device may include at least one or more display devices and/or one or more input devices for interaction with a player. A local processor, such as the above-described gaming device processor or a processor of a local server, may be operable with the display device(s) and/or the input device(s) of one or more of the gaming devices.

In operation, the central controller may be operable to communicate one or more of the stored game programs to at least one local processor. In different embodiments, the stored game programs may be communicated or delivered by embedding the communicated game program in a device or a component (e.g., a microchip to be inserted in a gaming device), writing the game program on a disc or other media, or downloading or streaming the game program over a dedicated data network, internet, or a telephone line. After the stored game programs may be communicated from the central server, the local processor may execute the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as available in the art, wherein a portion of each wager to initiate a base or primary game may be allocated to one or more progressive awards. In one embodiment, a progressive gaming system host site computer may be coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer may be maintained for the overall operation and control of the progressive gaming system. In this embodiment, a progressive gaming system host site computer may oversee the entire progressive gaming system and may be the master for computing all progressive jackpots. All participating gaming sites report to, and receive information from, the progressive gaming system host site computer. Each central server computer may be responsible for all data communication between the gaming device hardware and software and the progressive gaming system host site computer. In one embodiment, an individual gaming machine may trigger a progressive award win. In another embodiment, a central server (or the progressive gaming system host site computer) may determine when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win may be triggered based on one or more game play events, such as a symbol-driven trigger. In other embodiments, the progressive award triggering event or qualifying condition may be achieved by exceeding a certain amount of game play (such as number of games, number of credits, or amount of time), or reaching a specified number of points earned during game play. In another embodiment, a gaming device may be randomly or apparently randomly selected to provide a player of that gaming device one or more progressive awards. In one such embodiment, the gaming device may not provide any apparent reasons to the player for winning a progressive award, wherein winning the progressive award is not triggered by an event in or based specifically on any of the plays of any primary game. That is, a player may be provided a progressive award without any explanation or alternatively with simple explanations. In another embodiment, a player may be provided a progressive award at least partially based on a game triggered or symbol triggered event, such as at least partially based on the play of a primary game.

In one embodiment, one or more of the progressive awards may be each funded via a side bet or side wager. In this embodiment, a player may place or wager a side bet to be eligible to win the progressive award associated with the side bet. In one embodiment, the player may place the maximum bet and the side bet to be eligible to win one of the progressive awards. In another embodiment, if the player may place or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player may win one of the progressive awards. It may be appreciated that one or more of the progressive awards may each be funded, at least in part, based on the wagers placed on the primary games of the gaming machines in the gaming system, via a gaming establishment or via any suitable manner.

In another embodiment, one or more of the progressive awards may be partially funded via a side-bet or side-wager which the player may make (and which may be tracked via a side-bet meter). In one embodiment, one or more of the progressive awards may be funded with only side-bets or side-wagers placed. In another embodiment, one or more of the progressive awards may be funded based on player's wagers as described above as well as any side-bets or side-wagers placed.

In one alternative embodiment, a minimum wager level may be required for a gaming device to qualify to be selected to obtain one of the progressive awards. In one embodiment, this minimum wager level may be the maximum wager level for the primary game in the gaming machine. In another embodiment, no minimum wager level may be required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as by playing together as a team or group, to win one or more awards. In one such embodiment, any award won by the group may be shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Bitcoins

Referring now to FIG. 3, a flowchart of an example embodiment of a process for operating a gaming system, a gaming server or a gaming device disclosed herein is illustrated. In one embodiment, this process may be embodied in one or more software programs stored in one or more memories and executed by one or more processors or one or more servers. Although this process may be described with reference to the flowchart illustrated in FIG. 3, it may be appreciated that many other methods of performing the acts associated with this process may be used. For example, the order of certain steps described may be changed, or certain steps described may be optional.

In various embodiments, the gaming system may enable a player to wager a quantity of bitcoins on a play of a primary or base game as indicated in block 102. That is, unlike available gaming devices which enable a player to wager an amount of monetary credits, an amount of player tracking points and/or an amount of promotional credits on a play of a primary game, the gaming system disclosed herein additionally (or alternatively) may enable the player to wager an amount of bitcoins (or an amount of bitcoin fractions or fractional bitcoins) on a play of a primary game. The introduction of this additional type of currency may provide players additional avenues to wager on wagering games and thus increases the level of excitement and enjoyment associated with a player's gaming experience.

After the player wagers an amount of bitcoins on a play of a primary game, the gaming system may generate an outcome for the wagered on play of the primary game as indicated in block 104. The gaming system may then display the generated outcome to the player as indicated in block 106. In one such embodiment, as described above, the gaming system may randomly generate an outcome. In another such embodiment, as also described above, the gaming system may generate an outcome by utilizing a predetermined game outcome.

After displaying the generated outcome, the gaming system may determine an award associated with the generated outcome and may display the determined award to the player as indicated in blocks 108 and 110.

Following this award determination, the gaming system may determine if the determined award has value greater than zero as indicated in diamond 112. If the determined award has a value of zero, the gaming system returns to block 102 and again may enable the player to wager a quantity of bitcoins on a play of a primary or base game. On the other hand, if the determined award has a value greater than zero, the gaming system may provide the determined award to the player as indicated in block 114.

In one embodiment, in addition to determining any awards associated with the player's play of the primary or base game, the gaming system may determine if any secondary or bonus games are triggered and may determine to provide any awards to the player in associated with any triggered secondary or bonus games.

In one embodiment, the gaming system may provide any determined award to the player as a quantity or amount of bitcoins. In one such embodiment, if the currency of the utilized paytable of the game played is in bitcoins, the gaming system may provide the player the quantity or amount of bitcoins (or amount of bitcoin fractions) which the utilized paytable indicates are associated with the generated outcome. In another such embodiment, if the currency of the utilized paytable of the game played is not in bitcoins, the gaming system converts the determined, non-bitcoin award to a quantity or amount of bitcoins. For example, if the currency of the paytable utilized by the gaming system is U.S. dollars and the determined award is associated with an amount of U.S. dollars, the gaming system converts, using an applicable conversion rate, the amount of U.S. dollars to an amount of bitcoins. It may be appreciated that bitcoin conversion rates may change and thus at different points in time, the same amount of U.S. dollars may convert to different amounts of bitcoins.

In one embodiment, the gaming system may provide any determined award to the player as a quantity or amount of currency other than bitcoins, such as U.S. dollars. In another embodiment, the gaming system may provide any determined award to the player partially as a quantity or amount of bitcoins and partially as a quantity or amount of currency other than bitcoins. In these embodiments, the gaming system may enable a player to place one or more wagers using a first type of currency (i.e., bitcoins or bitcoin fractions) and may provide any awards to a player using a second, different type of currency.

In one embodiment, the gaming system may enable the player to select the currency which they want for any determined awards. In another embodiment, the gaming system automatically selects which currency will be used for any determined awards.

In one embodiment, the gaming system may enable a player to place any wagers in a non-bitcoin currency, such as U.S. dollars. In this embodiment, the gaming system may provide any determined award to the player as a quantity or amount of bitcoins. It may be appreciated that in this embodiment, the gaming system may enable a player to place one or more wagers using a first type of currency and may provide any awards to a player using a second, different type of currency (i.e., bitcoins or bitcoin fractions).

In one embodiment, the gaming system may enable a player to wager a quantity or amount of bitcoins (or an amount of bitcoin fractions) as a side wager. In different embodiments, the gaming system may enable a player to place a side wager of an amount of bitcoins on any event which may occur in association with the player's gaming experience.

In one embodiment wherein the gaming system uses two or more different types of currency, the gaming system may include a plurality of balances for the plurality of different types of currencies used. For example, the gaming system may display to the player: a first balance of an amount of monetary credits, such as an amount of U.S. dollars, a second balance of an amount of bitcoins. In one such embodiment, the gaming system may enable certain features to be purchased with amounts from certain balances and certain other features to be purchased with amounts from certain other balances. For example, the gaming system may enable a player to place primary game wagers with monetary credits maintained in a first balance and also enable the player to place side wagers with bitcoins maintained in a second, different balance.

In one embodiment, the gaming system may enable a player to wager an amount or quantity of bitcoins (or bitcoin fractions) on a game which may be implemented in a networked environment, such as over the Internet. In an Internet embodiment, the gaming system disclosed herein may be implemented using one or more servers, and individual users that access the servers by logging on from a personal web browser. In one such embodiment, a player transfers an amount of bitcoins from the player's bitcoin wallet to the gaming system. Once transferred, the player may be enabled to wager these bitcoins in association with one or more plays of one or more wagering games. In this embodiment, upon the conclusion of the player's gaming session (i.e., when the player wants to cash out any credit balance of any bitcoins), the gaming system transfers any bitcoins from the gaming system back to the player's bitcoin wallet. It may be appreciated that in this embodiment, each transaction involving each bitcoin may be recorded in association with that bitcoin's address.

In another embodiment, the gaming system may enable a player to wager an amount or quantity of bitcoins on a game played at a gaming device which may be located at a physical gaming establishment, such as casino. In this embodiment, to assist in the wagering of bitcoins at such a physical gaming establishment, the gaming system may utilize an interface that facilitates the exchange of bitcoins. That is, since bitcoins are an internet or network based currency, the gaming system may include one or more mobile interfaces configured to enable a player to utilize an amount of their internet based currency in a non-internet setting. In this embodiment, the interface may be stored on a mobile media, such as a USB thumb drive, a near field communication device or any other suitable storage device, which may communicate with the gaming system to enable a player to upload and/or download bitcoin data or information from the player's bitcoin wallet in conjunction with playing the wagering games at the gaming device located in the gaming establishment. Put differently, the gaming system may utilize a designated mobile device, such as any suitable portable memory device, to secure a player's bitcoin wallet and enable the utilization of one or more bitcoins at a physical gaming establishment.

In one example embodiment, the gaming system may utilize a designated mobile device, such as a designated USB thumb drive or designated near field communication device, which prevents the gaming system from having direct access to the player's bitcoin wallet. Rather, the designated mobile device may store the player's bitcoin wallet and may control access to the stored bitcoin wallet, such as only enabling a player to communicate with the bitcoin software via a secure channel. It may be appreciated that if a certain mobile device, such as a certain USB thumb drive or a certain near-field communication device, becomes the industry accepted standard for transferring bitcoins, the gaming system disclosed herein may be configured to utilize one or more interface ports and one or more bitcoin authenticating programs to operate with such an industry standard mobile device.

In another embodiment in which the player wagers an amount or quantity of bitcoins on a game played at a gaming device which may be located at a physical gaming establishment, such as casino, the gaming system enables a player to access an amount of bitcoins in association with one or more networked accounts. In this embodiment, to assist in the wagering of bitcoins at such a physical gaming establishment, the gaming system may store any information associated with a player's bitcoins and/or one or more mobile interfaces configured to enable a player to utilize an amount of their internet based currency in a non-internet setting in conjunction with an account, such as a player tracking account or a player bitcoin account. Such an account may be accessed over a suitable network to enable the player access to their bitcoins.

In another embodiment, the gaming system may convert an amount of a player's player tracking points to an amount of bitcoins (or bitcoin fractions). In another embodiment, the gaming system may convert an amount of a player's promotional credits to an amount of bitcoins (or bitcoin fractions). In another embodiment, the gaming system may convert an amount of a player's bitcoins (or bitcoin fractions) to an amount of player tracking points. In another embodiment, the gaming system may convert an amount of a player's bitcoins (or bitcoin fractions) to an amount of promotional credits. In these embodiments, since bitcoin conversion rates may change, at different points in time, the same amount of promotional credits and/or player tracking points may convert to different amounts of bitcoins (and vice-a-versa).

In another embodiment, the gaming system may employ a third party, such as a bitcoin escrow service, to convert an amount of a player's player tracking points to an amount of bitcoins (or bitcoin fractions). In another embodiment, the gaming system may employ a third party, such as a bitcoin escrow service, to convert an amount of a player's promotional credits to an amount of bitcoins (or bitcoin fractions).

In another embodiment, the gaming system may employ a third party, such as a bitcoin escrow service, to convert an amount of a player's bitcoins (or bitcoin fractions) to an amount of player tracking points. In another embodiment, the gaming system may employ a third party, such as a bitcoin escrow service, to convert an amount of a player's bitcoins (or bitcoin fractions) to an amount of promotional credits. In these embodiments, since bitcoin conversion rates may change, at different points in time, the same amount of promotional credits and/or player tracking points may convert to different amounts of bitcoins (and vice-a-versa).

In different embodiments, the game in which the wagering gaming system may enable the player to wager one or more bitcoins may include, but may not be limited to: any suitable slot game, any suitable free spins or free activations game, any suitable wheel game, any suitable card game, any suitable keno game, any suitable bingo game, any suitable die or dice game, any suitable virtual horse racing game; any suitable offer and acceptance game, any suitable award ladder game, any suitable puzzle-type game, any suitable persistence game, any suitable selection game, any suitable cascading symbols game, any suitable ways to win game, any suitable scatter pay game, any suitable elimination game, any suitable group or community cooperation game, any suitable group or community competition game, any game or type of game described herein or any other suitable type of game.

In different embodiments, the game in which the wagering gaming system may provide the player one or more bitcoins in association with the play of that game may include, but may not be limited to: any suitable slot game, any suitable free spins or free activations game, any suitable wheel game, any suitable card game, any suitable keno game, any suitable bingo game, any suitable die or dice game, any suitable virtual horse racing game; any suitable offer and acceptance game, any suitable award ladder game, any suitable puzzle-type game, any suitable persistence game, any suitable selection game, any suitable cascading symbols game, any suitable ways to win game, any suitable scatter pay game, any suitable elimination game, any suitable group or community cooperation game, any suitable group or community competition game, any game or type of game described herein or any other suitable type of game.

In another embodiment, in addition to or alternative to implementing bitcoins as an acceptable form of currency associated with a play of a wagering game, the gaming system may employ the processing power of a plurality of different processors to mine or generate bitcoins. In this embodiment, the gaming system employs one or more of the above described processors of one or more individual gaming devices and/or one or more processors of one or more of the above described central servers, central controllers or remote hosts to find the solutions to the mathematical problems which facilitate the creation of a quantity of bitcoins. That is, the gaming system disclosed herein utilizes the substantial amount of unused processing power of the various above-described processors to mine or generate one or more bitcoins.

In one such embodiment, while a player may be placing wagers to play one or more wagering games, the processor(s) of that player's gaming device may be used as network nodes in the bitcoin peer-to-peer network to mine bitcoins. In this embodiment, hashing software may be added to the client application such that in the background of the player's gaming experience, the hardware of the player's currently played gaming device may be placed in service as a bitcoin mining device. In another such embodiment in which the games may be implemented in a networked environment, such as over the Internet, while a player may be placing wagers to play one or more wagering games, the processor(s) of the networked gaming server may be used as network nodes in the bitcoin peer-to-peer network. In one embodiment, the networked gaming server may be used to mine bitcoins and thus create new bitcoins. In another embodiment in which the games may be implemented in a networked environment, such as over the Internet, while a player may be placing wagers to play one or more wagering games, the processor(s) of the remote gaming device (e.g., a player's home computer) may be used as network nodes in the bitcoin peer-to-peer network. In one such embodiment, an application that is communicated to a remote gaming device to facilitate a play of a game in a networked environment includes suitable software code or instructions to enable the remote gaming device to mine for bitcoins. In another such embodiment in which a game is played in association with a java supported browser, a java based miner is utilized to enable the remote gaming device to mine for bitcoins.

In another such embodiment, while a player may be placing wagers to play one or more wagering games, the processor(s) of that player's gaming device may be used as network nodes in the bitcoin peer-to-peer network to solve bitcoin block digests of bitcoin transactions between a payor and a payee. In this embodiment, the processor(s) which solve the bitcoin block digests earn a transaction fee for such facilitation of a bitcoin transaction. In another embodiment, in which the games may be implemented in a networked environment, the networked gaming server earns transaction fees by solving bitcoin block digests of bitcoin transactions between a payor and a payee. In these embodiments, the gaming system codes the mining software into the client application software and/or runs the mining software as a Java applet.

In one embodiment, one or more factors or characteristics of a player's gaming experience may influence the amount of the gaming system's processing power that is attributed to mining bitcoins and/or earning bitcoin related transaction fees. In one such embodiment, a player's rate of play influences the amount of the gaming system's processing power that is attributed to mining bitcoins and/or earning bitcoin related transaction fees. For example, the faster a player's rate of play (i.e., the more wagering games played in a designated period of time), the greater the amount of processing power attributed to mining bitcoins and/or earning bitcoin related transaction fees. In another such embodiment, an amount of a player's wager influences the amount of the gaming system's processing power that is attributed to mining bitcoins and/or earning bitcoin related transaction fees. For example, higher wager amounts placed are associated with greater amounts of processing power attributed to mining bitcoins and/or earning bitcoin related transaction fees.

In various embodiments, the gaming system may include one or more additional processors and/or additional servers which mine bitcoins and/or earn bitcoin related transaction fees. In these embodiments, such additional processor and/or additional servers are distinct from the processor(s) and/or server(s) which may facilitate a player's play of one or more wagering games. In various embodiments, the gaming system may employ one or more third-party processors and/or third-party servers which mine bitcoins and/or earn bitcoin related transaction fees. In these embodiments, such third-party processor and/or third-party servers are distinct from the processor(s) and/or server(s) which may facilitate a player's play of one or more wagering games.

In one embodiment, if a player is playing at a gaming device and that gaming device is associated with the creation of a quantity of bitcoins, the gaming system may provide the player a portion of, but less than all, of the created quantity of bitcoins. In another embodiment, if a player is playing at a gaming device and that gaming device is associated with the creation of a quantity of bitcoins, the gaming system may provide the player the created quantity of bitcoins. In another embodiment, if a player is playing at a gaming device and that gaming device is associated with the creation of a quantity of bitcoins, the gaming system may provide the player a bonus award which is independent of the created bitcoins (or triggers a bonus game associated with an opportunity to win a bonus award).

In one embodiment, if a player is playing at a gaming device and that gaming device is associated with the earning of transaction fees for the facilitation of a bitcoin transaction, the gaming system may provide the player a portion of, but less than all, of the earned transaction fee. In another embodiment, if a player is playing at a gaming device and that gaming device is associated with the earning of transaction fees for the facilitation of a bitcoin transaction, the gaming system may provide the player the earned transaction fee. In another embodiment, if a player is playing at a gaming device and that gaming device is associated with the earning of transaction fees for the facilitation of a bitcoin transaction, the gaming system may provide the player a bonus award which is independent of the earned transaction fees (or triggers a bonus game associated with an opportunity to win a bonus award).

In one embodiment in which a player is provided an amount of bitcoins (or another type of award) based on the generation or mining of a quantity of bitcoins in association with a player's play of one or more games, the gaming system may require the player to make one or more inputs in association with the mining of the quantity of bitcoins, such as making an input after a designated period of time. In another embodiment in which a player is provided an amount of bitcoins (or another type of award) based on the generation or mining of a quantity of bitcoins in association with a player's play of one or more games, the gaming system may automatically provide the player any amount of bitcoins (or any other type of awards).

In various embodiments, the gaming system may mine bitcoins and/or earn bitcoin related transaction fees independent of the type of currency being wagered on plays of one or more games and/or independent of the type of currency being provided to a player as a result of the plays of one or more games. That is, one form of currency is provided to the player in association with the utilization of the gaming system's processing power, wherein that form of currency may or may not be used in association with other aspects of a player's gaming experience.

It may be appreciated that in addition to or as an alternative to utilizing bitcoins in association with a player's play of a game and/or earning bitcoins in association with the utilization of one or more processors to mine additional bitcoins, any of the above-described features or attributes may be implemented in association with one or more electronic tables which provide one or more table wagering games.

It may be appreciated that in different embodiments, one or more of:
  i. which games or types of games a player may be enabled to wager a quantity of bitcoins on;
  ii. an amount or quantity of bitcoins a player may be enabled to wager on a game;
  iii. which games or types of games a player may be enabled to side wager a quantity of bitcoins on;
  iv. an amount or quantity of bitcoins a player may be enable to side wager on a game;
  v. a conversion rate of bitcoins to another type or form of currency;
  vi. a conversion rate of another type or form of currency to bitcoins;
  vii. which gaming devices to utilize to mine bitcoins and/or facilitate bitcoin transactions;
  viii. which central server to utilize to mine bitcoins and/or facilitate bitcoin transactions;
  ix. an amount of a bonus award provided to the player for the successful mining of a bitcoin by the player's currently played gaming device and/or a central server;
  x. which bonus game may be triggered for the successful mining of a bitcoin by the player's currently played gaming device and/or a central server;
  xi. an amount of a bonus award provided to the player for the successful facilitation of a bitcoin transaction by the player's currently played gaming device and/or a central server;
  xii. which bonus game may be triggered for the successful facilitation of a bitcoin transaction by the player's currently played gaming device and/or a central server;
  xiii. any determination disclosed herein;

may be predetermined, randomly determined, randomly determined based on one or more weighted percentages, determined based on a generated symbol or symbol combination, determined based on a random determination by the central controller, determined based on a random determination at the gaming system, determined based on a player's selection, determined based on one or more side wagers placed, determined based on the player's primary game wager, determined based on time (such as the time of day), determined based on an amount of coin-in accumulated in one or more pools, determined based on a status of the player (i.e., a player tracking status), or determined based on any other suitable method or criteria.

It may be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:
1. A gaming system comprising:
  at least one display device;
  at least one input device;
  at least one processor; and
  at least one memory device which stores a plurality of instructions, which when executed by the at least one processor, cause the at least one processor to operate with the display device and the at least one input device to:
    (a) receive a wager of a first amount of bitcoins on a play of a wagering game,
    (b) generate an outcome for the play of the wagering game,
    (c) display the generated outcome,
    (d) provide any award associated with the generated outcome, and
    (e) distinct from the generation of the outcome:
      (i) determine whether to provide any bitcoins, said determination being independent of any outcomes generated in any plays of any games, and being based, at least in part, on if at least one newly created bitcoin is successfully mined, and (ii) if the determination is to provide any bitcoins, provide a second amount of bitcoins.

2. The gaming system of claim 1, wherein the award is a third amount of bitcoins.

3. The gaming system of claim 1, wherein the award is a form of currency different than bitcoins.

4. The gaming system of claim 1, wherein the second amount of bitcoins includes at least part of the at least one newly created bitcoin.

5. The gaming system of claim 1, wherein when executed by the at least one processor, the plurality of instructions cause the at least one processor to access a bitcoin wallet using a mobile media device.

6. The gaming system of claim 1, wherein the first amount of bitcoins and the second amount of bitcoins are a same amount.

7. A method of operating a gaming system, the method comprising:
- (a) receiving a wager of a first amount of bitcoins on a play of a wagering game;
- (b) causing at least one processor to execute a plurality of instructions to generate an outcome for the play of the wagering game;
- (c) causing at least one display device to display the generated outcome;
- (d) providing any award associated with the generated outcome, and
- (e) distinct from the generation of the outcome:
  - (i) causing the at least one processor to determine whether to provide any bitcoins, said determination being independent of any outcomes generated in any plays of any games, and being based, at least in part, on if at least one newly created bitcoin is successfully mined, and
  - (ii) if the determination is to provide any bitcoins, providing a second amount of bitcoins.

8. The method of claim 7, wherein the award is a third amount of bitcoins.

9. The method of claim 7, wherein the award is a form of currency different than bitcoins.

10. The method of claim 7, wherein the second amount of bitcoins includes at least part of the at least one newly created bitcoin.

11. The method of claim 7, which includes causing the at least one processor to execute the plurality of instructions to access a bitcoin wallet using a mobile media device.

12. The method of claim 7, which is provided through a data network.

13. The method of claim 12, wherein the data network is the internet.

14. The method of claim 7, wherein the first amount of bitcoins and the second amount of bitcoins are a same amount.

15. A non-transitory computer readable medium including a plurality of instructions, which when executed by at least one processor, cause the at least one processor to:
- (a) receive a wager of a first amount of bitcoins on a play of a wagering game;
- (b) generate an outcome for the play of the wagering game;
- (c) cause at least one display device to display the generated outcome;
- (d) provide any award associated with the generated outcome, and
- (e) distinct from the generation of the outcome:
  - (i) determine whether to provide any bitcoins, said determination being independent of any outcomes generated in any plays of any games, and being based, at least in part, on if at least one newly created bitcoin is successfully mined, and
  - (ii) if the determination is to provide any bitcoins, provide a second amount of bitcoins to the player.

16. The non-transitory computer readable medium of claim 15, wherein the award is a third amount of bitcoins.

17. The non-transitory computer readable medium of claim 15, wherein the award is a form of currency different than bitcoins.

18. The non-transitory computer readable medium of claim 15, wherein the second amount of bitcoins includes at least part of the at least one newly created bitcoin.

19. The non-transitory computer readable medium of claim 15, wherein when executed by the at least one processor, the plurality of instructions cause the at least one processor to access a bitcoin wallet using a mobile media device.

20. The non-transitory computer readable medium of claim 15, wherein the first amount of bitcoins and the second amount of bitcoins are a same amount.

21. A wagering gaming system comprising:
- at least one display device;
- at least one input device;
- at least one processor; and
- at least one memory device which stores a plurality of instructions, which when executed by the at least one processor, cause the at least one processor to operate with the display device and the at least one input device to:
  - (a) receive a wager on a play of a wagering game,
  - (b) generate an outcome for the play of the wagering game,
  - (c) display the generated outcome, and
  - (d) provide a first amounts of bitcoins associated with the generated outcome, and
  - (e) distinct from the generation of the outcome:
    - (i) determine whether to provide any bitcoins, said determination being independent of any outcomes generated in any plays of any games, and being based, at least in part, on if at least one newly created bitcoin is successfully mined, and
    - (ii) if the determination is to provide any bitcoins, provide a second amount of bitcoins.

22. The wagering gaming system of claim 21, wherein the wager is a third amount of bitcoins.

23. The wagering gaming system of claim 21, wherein the wager is a form of currency different than bitcoins.

24. The wagering gaming system of claim 21, wherein the second amount of bitcoins includes least part of the at least one newly created bitcoin.

25. The wagering gaming system of claim 21, wherein when executed by the at least one processor, the plurality of instructions cause the at least one processor to access a bitcoin wallet using a mobile media device.

26. A method of operating a wagering gaming system, said method comprising:
- (a) receiving a wager on a play of a wagering game;
- (b) causing at least one processor to execute a plurality of instructions to generate an outcome for the play of the wagering game;
- (c) causing at least one display device to display the generated outcome;
- (d) providing a first amounts of bitcoins associated with the generated outcome, and
- (e) distinct from the generation of the outcome:
  - (i) causing the at least one processor to determine whether to provide any bitcoins, said determination being independent of any outcomes generated in any plays of any games, and being based, at least in part, on if at least one newly created bitcoin is successfully mined, and (ii) if the determination is to provide any bitcoins, providing a second amount of bitcoins.

27. The method of claim 26, wherein the wager is a third amount of bitcoins.

28. The method of claim 26, wherein the wager is a form of currency different than bitcoins.

29. The method of claim 26, wherein the second amount of bitcoins includes at least part of the at least one newly created bitcoin.

30. The method of claim 26, which includes causing the at least one processor to execute the plurality of instructions to access a bitcoin wallet using a mobile media device.

31. The method of claim 26, which is provided through a data network.

32. The method of claim 31, wherein the data network is the internet.

33. The wagering gaming system of claim 21, wherein the first amount of bitcoins and the second amount of bitcoins are a same amount.

34. The method of claim 26, wherein the first amount of bitcoins and the second amount of bitcoins are a same amount.

\* \* \* \* \*